O. A. KENYON.
ELECTRIC WELDING.
APPLICATION FILED JUNE 28, 1916.
1,218,268.
Patented Mar. 6, 1917.
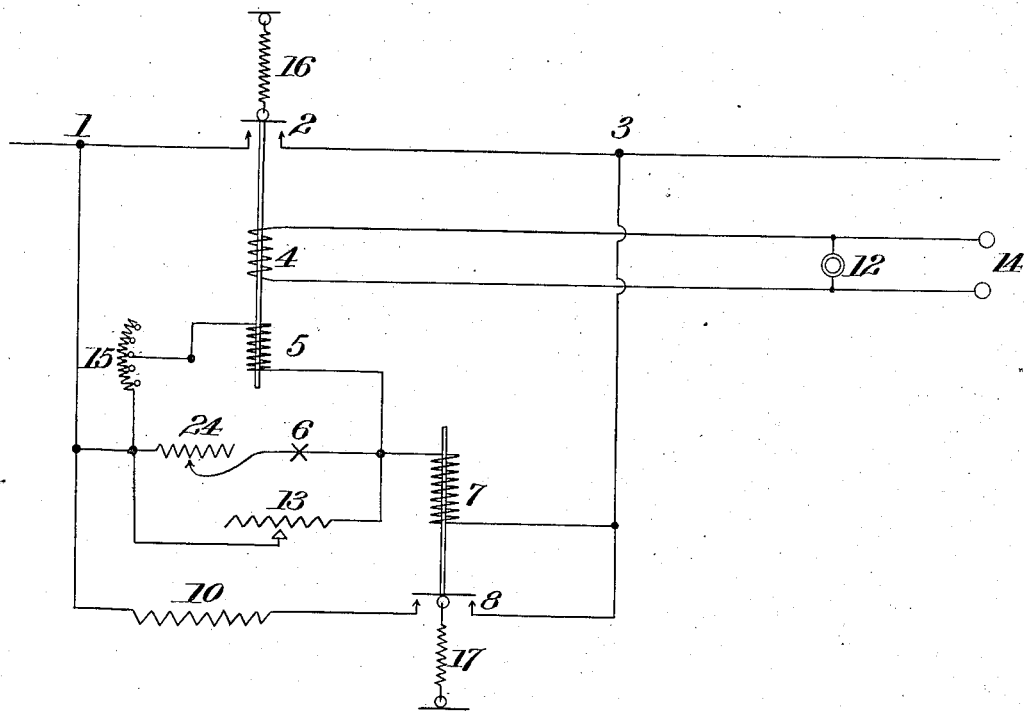
Inventor
Otis Allen Kenyon.
By T. Walter Fowler
Attorney

UNITED STATES PATENT OFFICE.

OTIS ALLEN KENYON, OF NEW YORK, N. Y.

ELECTRIC WELDING.

1,218,268.　　　　　Specification of Letters Patent.　　Patented Mar. 6, 1917.

Application filed June 28, 1916. Serial No. 106,425.

*To all whom it may concern:*

Be it known that I, OTIS ALLEN KENYON, a citizen of the United States, residing at New York city, in the county of New York and State of New York, have invented certain new and useful Improvements in Electric Welding, of which the following is a specification.

My invention relates to the art of electric welding, and it consists of the parts and the arrangements and combinations of parts substantially as I will hereinafter describe and claim.

A leading object of the present invention is to adjust the current in the arc by means of a combination of resistances in such a way, that I may shunt from the main circuit, any desired value of current through the arc without in any way modifying the power and current regulating characteristics of said arc, which I may adjust to suit the requirements. In other words, in this improved system, I use a regulated current welding arc combined with means adapted to adjust the current through and regulate the power and current variations in said arc.

In the accompanying drawing forming part of this specification the figure illustrates more or less diagrammatically, a circuit for a system capable of carrying out the present invention.

In order that the present invention may be fully understood, and the value of the same appreciated, I will state that although electric arc welding is one of the oldest practical applications of electricity, it has apparently not come into the general use it might have, had it been better understood, and the welding current better controlled.

Heretofore, two general systems of electric distribution have been employed in electric arc welding, namely, the constant-potential system and the constant-current system. The first-named system, namely, the constant-potential system, is the oldest and is universally used where more than one welder operates from the same machine. The constant-current system may properly be sub-divided into two types, namely, the open circuit and the closed circuit. The open-circuit system which is well known in the art is limited to use with one arc on each machine; it has other drawbacks, which I will hereinafter mention. The closed circuit constant-current system was, apparently, first disclosed in my prior Patent No. 1,181,227, dated May 2, 1916, which system has opened great possibilities in the way of heat control which exist in no other system of which I have knowledge.

That the advantages to be derived from the proper control of the heat effects in the welding arc may be better understood, it is desirable at this time to consider the factors which enter into said control. It is known that the rate of total heat production in the arc is equal to the power in watts consumed between the terminals of the arc, but the temperature of the metal is not simply nor directly related to the watts consumed. In order to control the temperature of the metal, it is necessary then to take into account all of the factors that determine it. Therefore, it may be well to analyze briefly, the production of heat in an electric welding arc.

Beginning with the pencil point which ordinarily, but not necessarily, is connected to the negative side of the circuit, we find that the temperature produced here depends upon the power in watts consumed at this point, that is, upon the product of the current through the arc and the E. M. F. drop at the terminal of the arc. Experience has shown that the E. M. F. drop at each terminal of the arc is practically constant, and independent of the current; that is, the resistance at each terminal of the arc decreases when the current increases, and vice versa, which accounts for the instability of a metallic arc when connected to a source of constant-potential, and this is the reason why it must be connected in series with a relatively large resistance. Therefore, since the E. M. F. is constant, the temperature of the metal at the pencil point, in other words, the flow of the metal from the pencil point depends almost entirely upon the current alone.

Again, the temperature of the metal in the arc stream is determined by the power consumed in the stream, and by the rate of flow from the pencil.

The resistance of the arc stream seems to be approximately constant per unit of length, so that the E. M. F., consumed is directly proportional to the length of the arc. This is the reason that a carbon arc with a long stream can be operated from a constant-potential source without a series resistance. The resistance of the arc stream takes the place of an external resistance and stabilizes the arc sufficiently to prevent its being extinguished. The power consumed in the arc is the product of the current through the arc and the voltage drop in the stream; while the flow of metal is determined by the current, as above indicated. Since the resistance of the stream is directly proportional to its length, the length of the arc is fixed by the voltage impressed across it. Therefore, in order to control the temperature of the metal in the stream, we must control both the current and the E. M. F. and each independently of the other.

The temperature at the end of the arc where it impinges upon the work depends upon the rate of flow of the metal, the temperature of the metal that arrives, and upon the rate at which energy is produced in the terminal itself, as well as upon the heat dissipating capacity of the mass surrounding the point where the metal is deposited. I have heretofore considered the origin of the heat brought in by the molten metal itself, and I will here state that the heat produced at this terminal of the arc is exactly similar to that produced at the other terminal; that is, it depends upon the current through the arc. Therefore, it will be seen that the final temperature of the metal depends upon both the current and the E. M. F.; and that the value of each must be controlled independently, if anything like accurate results are to be obtained while still retaining the flexibility of application.

In the present invention I propose to adjust the current in the arc by means of a combination of resistances in such a way that I may shunt from the main circuit, any desired value of current through the arc without in any way modifying the power and current regulating characteristic of the arc which I may adjust to suit the requirements.

In my prior Patent No. 1,181,227, dated May 2, 1916, and in an application filed of even date herewith, I have disclosed closed circuit constant-current systems which had two limitations in the heat adjustment, viz:

(a) The current was adjusted by means included in the main circuit and affected all arcs connected in series. Individual adjustment obtained by a shunt across the terminals of the controller (Patent No. 1,181,227), was not altogether satisfactory from regulation standpoint.

(b) The use of a shunt across the arc (prior application referred to) made it possible to adjust the current for some given voltage, but the constant changing in voltage across the terminal of the arc was accompanied by a variation in current through the arc, that was different for each value of shunt resistance. The present invention provides means for adjusting the current through the arc without affecting the regulation characteristic of the shunt around the arc.

To make the invention understood, I will now briefly describe the apparatus shown:

1 and 3 are terminals which are connected in a circuit which carries a regulated current; 2 is a short-circuiting contact; 4 is a solenoid coil connected to a separate source, 14, of electric energy, and which coil may be short-circuited by a push-button 12 or equivalent circuit closer; 5 represents a solenoid coil, the core of which and of the coil, 4, is connected to the contactor, 2, which in turn is connected to a spring, 16; 6 is the welding arc and 7 is the solenoid coil in parallel therewith, the core of the coil being connected to a contactor, 8, to which is attached a spring, 17; 10 is a resistance which is in series with the contactor, 8; 13 is a shunt; 15 is a rheostat of suitable construction, and 24 is an adjustable regulator.

The terminals 1 and 3 are, as before mentioned, connected in a circuit which carries a regulated current. Normally, the terminals of this circuit are closed through the short-circuiting contact, 2, which is held closed by the solenoid coil, 4, connected to the separate source of energy, 14.

Connected to the terminals, 1 and 3, I have the resistance, 10, in series with the contactor, 8, and the arc-circuit, 6 and 7, in parallel therewith. The contactor, 8, is also normally closed, but no current passes that way on account of the fact that the closure at the contact, 2, reduces the voltage drop between the terminals, 1 and 3, to practically nothing.

In operation, the pressing of the push button, 12, or like circuit closer, short-circuits the coil, 4, thereby releasing the contactor, 2, under the tension of the spring, 16. Current in the main circuit now passes through the terminal, 1, resistor, 10, and contactor, 8, back to terminal, 3, thus causing a drop in E. M. F. through said resistor. If the terminals of the arc, 6, are brought together, the resistance through that circuit will be so much less than through the resistor, 10, and contactor, 8, that a large proportion of the current will immediately pass through the adjustable regulator, 24, the arc, 6, and solenoid coil, 7, and in so doing, said coil, 7, is energized and thereby opens the contactor, 8, leaving the arc, 6, and the adjustable shunt, 13, as the only path through which the main circuit is maintained, and therefore, carrying all of the current. As the arc is lengthened and shortened in operation, more or less current is shunted through the part, 13, and solenoid coil, 5. This coil and the coil, 4, assist each other in pulling against the tension of the spring, 16, and whenever the E. M. F. across the arc, 6, rises sufficiently it will force enough current through the coil, 5, so that the combined pull of the coils, 4 and 5, will overcome the tension of the spring, 16, and short-circuit the arc, by closing the contactor, 2, which prevents absolutely any further rise in E. M. F. and kills the arc, without any possibility of temperature increase, which will burn the metal. The coil, 4, holds the contactor, 2, closed, killing the arc, 6, and coil, 7, so that the contactor, 8, is again closed under the action of the spring, 17, leaving the control circuit in exactly the same condition as at the start. The circuit division between the arc, 6, and the shunt, 13, is determined by the adjustment of the regulator or resistance, 24, and any adjustment made in this manner will not affect the percentage change in current through the arc for any given change in voltage. This can only be effected by a change in the resistance of the shunt, 13.

It will be readily seen that the circuits shown are connections of a controller which may be used in a closed circuit-series system, such as described in my prior patent, before alluded to. The shunt in said patent was of no use except where more than one arc was used on the circuit. However, in the present instance, the shunt is just as useful in case of one arc alone, as where a series of arcs are employed. It may also be used on any system to control the regulation characteristic of the arc.

I, therefore, in the present invention adjust the current in the arc by means of a combination of resistances in such a way that I may shunt from the main circuit any desired value of current through the arc without in any way modifying the power and current regulation characteristic of the arc, which I may adjust to suit the requirements.

Having thus described my invention what I claim as new and desire to secure by Letters Patent is:

1. In electric welding, a regulated current welding arc, means for adjusting the current through said arc, and additional means for regulating the power and current variations in said arc.

2. In electric welding, a regulated current welding arc, a shunt circuit around the arc to keep the regulation of the arc current and power within predetermined limits, and means for adjusting the current through the arc.

3. In electric welding, a regulated current welding arc, a shunt circuit around the arc to regulate fluctuations in power and current in the arc, and a resistance in series with the arc between the terminals of the shunt.

4. In electric welding, a regulated current welding arc, and a resistance in series therewith, in combination with a shunt circuit around said arc and said resistance, and an adjustable resistance in said shunt circuit.

5. In electric welding, a regulated current welding arc, an adjustable resistance in series therewith, in combination with a shunt circuit around said arc and said resistance.

In testimony whereof I affix my signature.

OTIS ALLEN KENYON.